June 24, 1930. E. H. DANIEL 1,765,788
HITCHING DEVICE FOR TRACTOR DRAWN IMPLEMENTS
Filed March 12, 1928
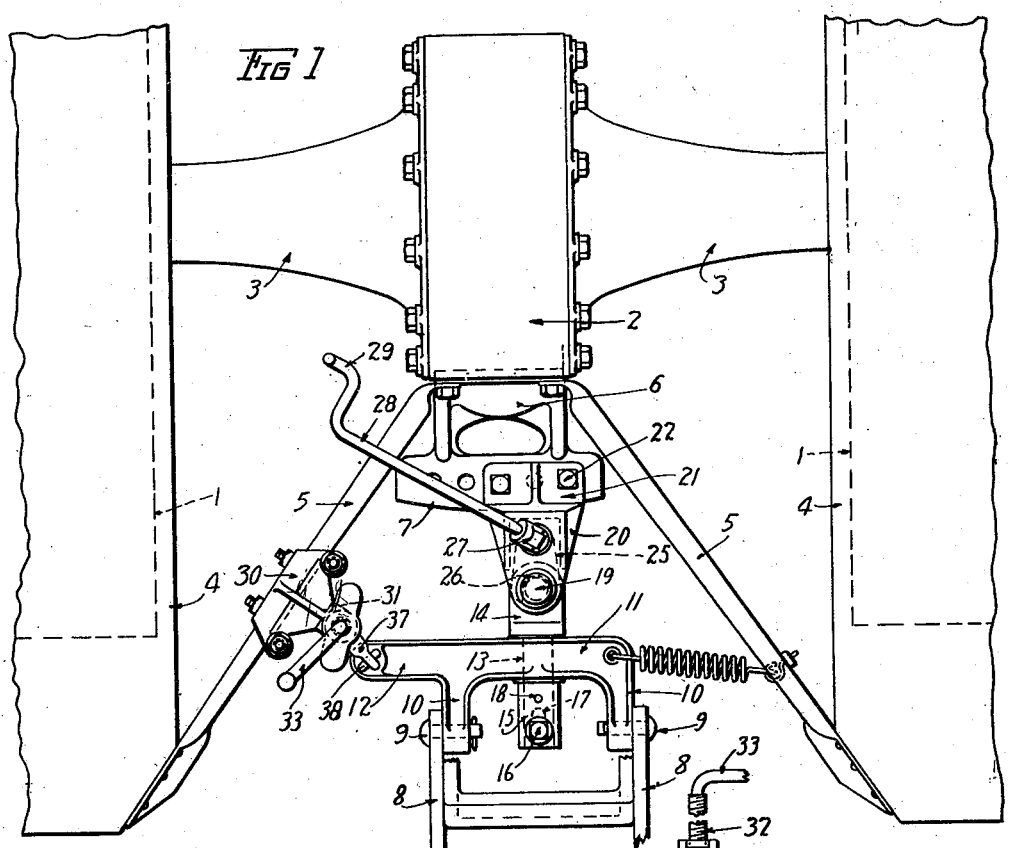
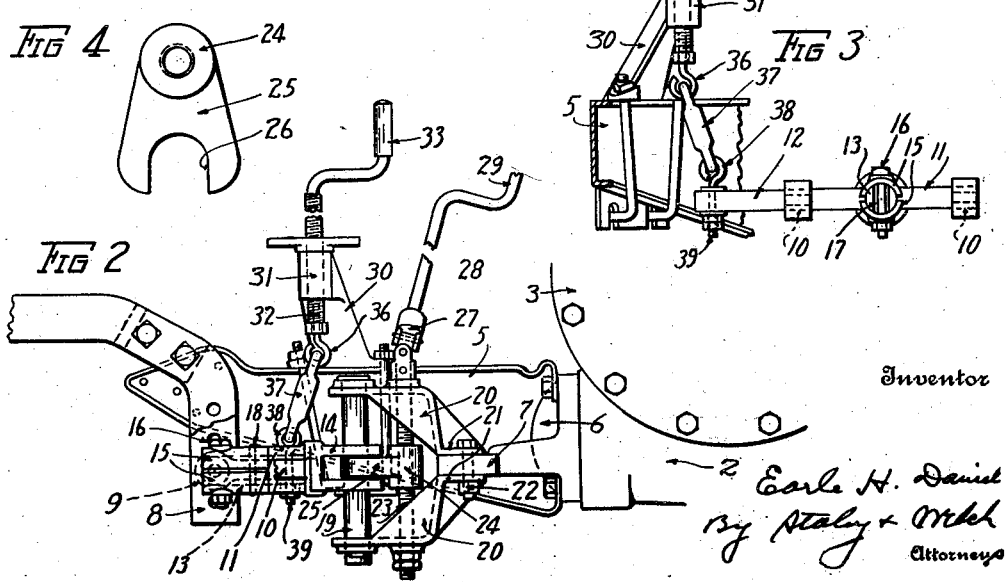
Inventor
Earle H. Daniel
By Staley & McKeh
Attorneys Patented June 24, 1930

1,765,788

UNITED STATES PATENT OFFICE

EARLE H. DANIEL, OF SPRINGFIELD, OHIO

HITCHING DEVICE FOR TRACTOR-DRAWN IMPLEMENTS

Application filed March 12, 1928. Serial No. 261,094.

This invention relates to hitching devices, it particularly relating to devices for hitching a plow or other implement to a tractor, and especially to improved means associated with the hitching devices for tilting the implement to level it with relation to the ground and also means for raising and lowering the implement with relation to the ground to regulate the depth of penetration.

The object of my invention is to simplify and make more effective the construction and operation of devices of the character referred to.

In the accompanying drawings:

Fig. 1 is a top plan view of a portion of the rear part of the tractor and a portion of the beam of the implement together with my improved hitch devices.

Fig. 2 is a side elevation of the hitch devices, with a portion of the yoke-shaped member and the plow beam broken away.

Fig. 3 is a rear elevation of a portion of the hitch devices.

Fig. 4 is a top plan view of one of the parts of the raising and lowering device.

Referring to the drawings, 1 represents the rear tractor wheels, 2 the differential housing, 3 the extensions therefrom, 4 the fenders, 5 the fender braces, and 6 the draw-bar cap of a tractor, the cap having the usual horizontal flange 7 provided with a series of openings to which the draw-bar is connected and which I utilize in the present case for the purpose of connecting my improved hitch devices. There is shown at 8 a pair of parallel spaced apart members which form the beam of the implement or are rigidly attached thereto. The ends of these members 8 are pivotally connected by pins 9 with the arms 10 of a yoke-shaped member 11 which has a lateral extension 12. The central portion of this yoke-shaped member has a longitudinal bore to receive a coupling pin 13, having a bifurcated head 14. Clamped to the rear end of the coupling pin is a two-part collar 15, a bolt 16, passing through a slotted opening 17 in the pin, serving to clamp the collar to the pin, this slotted opening extending to the extreme rear end of the pin. The collar and coupling pin are also connected together by a wooden connecting pin 18. The member is confined beneath this split collar and a shoulder formed by the head of the pin.

The members of the bifurcated head 14 are perforated to receive a vertical pin 19 which pivotally connects to the head a clevis formed of two similarly constructed members 20 which are likewise perforated to receive the pin. Each of these members 20 has an arm 21 which is secured by a bolt 22 to the flange 7 of the cap 6.

Rotatably mounted in the clevis members 20 is a screw 23 and threaded upon this screw is a follower 24 having an arm 25 formed with a slot 26 on its free end which embraces the pin 19 between the members of the bifurcated head 14. Connected with the upper end of the screw by universal joints 27 is a rod 28 having a crank arm 29 by which the screw can be rotated. Rotation of the screw in either direction causing a corresponding up or down movement of the follower 24 and a consequent raising or lowering of the end of the beam of the plow or other implement.

Secured to one of the fender braces 5 is a bracket 30 having a threaded sleeve 31 in which is threaded a screw 32 having at its upper end a crank arm 33. The lower end of this screw has connected therewith an eye 36 to receive a link 37 which connects the screw with the eye 38 of a bolt 39 which is secured to the extension 12 of the yoke-shaped member 11. Rotation of this screw 32 in either direction causes a corresponding tilting movement of the plow beam.

By this arrangement it will be seen that effective means are provided for raising or lowering the forward end of the beam of the implement to regulate the depth of penetration of the ground breaking tool of the implement and also for tilting the beam for the purpose of leveling the implement with relation to the ground.

Having thus described my invention, I claim:

1. In a hitch for a tractor and implement, a hitch member connected with the implement, a second hitch member connected with the tractor, a vertical pin forming a connection between said members arranged to permit relative vertical movement between the same, a screw carried by the tractor hitch member, a follower on said screw having a sliding engagement with said pin, and a connection between said follower and said implement hitch member whereby raising and lowering of the follower causes a corresponding movement of the implement.

2. In a hitch for a tractor and implement, a hitch member connected with the implement, a second hitch member connected with the tractor, a pin pivotally connecting said members together but permitting relative up and down movement thereof, a screw carried by the tractor member, a follower on said screw, and a connection between said follower and said implement member whereby raising and lowering of the follower causes a corresponding movement of the implement member.

3. In a hitch for a tractor and implement, a hitch member pivotally connected with the implement by a horizontal pivot, a second hitch member rigidly connected with the tractor having a pair of spaced apart arms arranged in vertical alignment, a pin carried by said arms, said implement hitch member having a bifurcated portion apertured to receive said pin, a vertically arranged screw carried by said tractor member, a follower threaded on said screw having a part projecting between the bifurcated portion of said implement hitch member, and means for rotating said screw.

4. In a hitch for a tractor and implement, a yoke-shaped member having a pivoted connection with the beam of the implement, a pin swivelly connected with said member having a bifurcated head, a member rigidly connected with the tractor having spaced apart arms arranged in vertical alignment, a second pin carried by said arms, the bifurcated portion of said head having apertures to receive said second pin, a vertically extending screw carried by said tractor member, a follower threaded on said screw having a part projecting between the members of said head, and means for rotating said screw.

In testimony whereof, I have hereunto set my hand this 1st day of March, 1928.

EARLE H. DANIEL.